(12) United States Patent
Mori et al.

(10) Patent No.: US 7,124,278 B2
(45) Date of Patent: Oct. 17, 2006

(54) INFORMATION PROCESSING DEVICE AND METHOD, PROGRAM, DATA STRUCTURE, AND COMPUTER-READABLE RECORDING MEDIUM

(75) Inventors: Masaya Mori, Kawasaki (JP); Shinpei Watanabe, Yokohama (JP); Yoshihisa Takatsu, Yamato (JP); Toshio Sunaga, Ohtsu (JP)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 10/707,941

(22) Filed: Jan. 27, 2004

(65) Prior Publication Data
US 2004/0148487 A1    Jul. 29, 2004

(30) Foreign Application Priority Data
Jan. 27, 2003  (JP) .............................. 2003-016843

(51) Int. Cl.
*G06F 12/00* (2006.01)
(52) U.S. Cl. ....................... 711/216; 711/220
(58) Field of Classification Search ................ 711/216, 711/220
See application file for complete search history.

(56) References Cited

U.S. PATENT DOCUMENTS

| | | | | |
|---|---|---|---|---|
| 5,757,795 A | * | 5/1998 | Schnell ..................... | 370/392 |
| 5,920,900 A | * | 7/1999 | Poole et al. .............. | 711/216 |
| 6,212,525 B1 | * | 4/2001 | Guha ........................ | 707/101 |
| 6,434,662 B1 | * | 8/2002 | Greene et al. ........... | 711/108 |
| 6,665,297 B1 | * | 12/2003 | Hariguchi et al. ........ | 370/392 |
| 6,697,873 B1 | * | 2/2004 | Yik et al. .................. | 709/238 |
| 6,862,602 B1 | * | 3/2005 | Guha ........................ | 707/101 |

FOREIGN PATENT DOCUMENTS

EP        1019840 B1  *  9/1998

* cited by examiner

*Primary Examiner*—Donald Sparks
*Assistant Examiner*—Yaima Campos
(74) *Attorney, Agent, or Firm*—Lisa U. Jaklitsch

(57) ABSTRACT

Upon implementing a data registration into or a data retrieval from a data table (3) where first item data are registered along with corresponding second item data, there are used a first pointer table (1) where pointers to part of the registered data in the data table are registered in storage positions that are designated by hash values obtained by applying a first hash function (6) to the first item data of the part of the registered data, and a second pointer table (2) where pointers to the other registered data in the data table are registered in storage positions that are designated by hash values obtained by applying a second hash function (22) to the first item data of the other registered data.

9 Claims, 8 Drawing Sheets

INFORMATION PROCESSING DEVICE AND METHOD, PROGRAM, DATA STRUCTURE, AND COMPUTER-READABLE RECORDING MEDIUM

BACKGROUND OF INVENTION

The present invention relates to an information processing device and an information processing method that registers data into a data table where first item data is registered along with corresponding second item data, and retrieve the second item data corresponding to the first item data from the data table, and further relates to a program that enables a computer to function as such an information processing device, a data structure possessed by such an information processing device, a computer-readable recording medium recording therein such a program, and a computer-readable recording medium storing therein such a data structure.

Conventionally, in the field of network switch products such as L2 switches or L3 switches, there has been known such a system that can support more than a hundred and several tens of thousands of MAC addresses. The system can support many servers and clients, while, for identifying a corresponding destination port from a MAC address of a received packet, it is necessary to search through all MAC addresses held for that purpose to thereby retrieve the corresponding destination port.

In view of this, the system is configured so as to be able to search the MAC addresses at high speed using a hash method. Specifically, a MAC address table storing therein MAC addresses and destination ports in a corresponding relationship is prepared so as to be directly accessible by a hash key obtained by applying a hash function to a MAC address and, when a packet is received, a corresponding destination port can be identified using a hash key obtained based on a MAC address in the packet (e.g. see Patent Literature 1). In this event, when the same hash key is obtained from different MAC addresses, data corresponding to those MAC addresses are stored using chaining or the like and, upon retrieval, they are accessed using the common hash key and tracing chaining pointers.

However, inasmuch as there exist no complete hash functions, using any hash function can not avoid dispersion of data like many MAC addresses correspond to a particular hash key. Such data dispersion prevents an efficient search through the MAC addresses. It is, therefore, the present state wherein every time data is changed, the whole table is reprepared using a different hash function.

Particularly, when connection places are not fixed like mobile products, it is possible that a relationship between MAC addresses and ports of a switch or router changes momentarily, and addition and deletion of data relative to a MAC address table are constantly repeated. Therefore, inasmuch as averaging of data variance by the use of a hash function breaks down following the addition and deletion of data in the MAC address table, it is necessary to frequently perform sorting of data by changing hash function.

In case of a large-scale switch wherein the number of entries in a MAC address table exceeds a hundred and several tens of thousands, it takes a long time to calculate hash values again and sort data following the change of a hash function. Therefore, in effect, the change of the hash function requiring recalculation of hash values and sorting of data is not carried out. Specifically, it is the present state that when the number of entries in a memory area of addresses corresponding to a hash value exceeds an allowable value, entries are prevented from increasing with respect to such a hash value, while broadcast is used for dealing therewith. Since the broadcast is for transferring the same data over the network, it disables transmission of other packets to thereby extremely lower the network efficiency. In contrast, when it is configured to enter data corresponding to all MAC addresses, it is necessary to repeat many times a search that traces pointers, and therefore, a search time is prolonged.

SUMMARY OF INVENTION

In view of the foregoing problems of the prior art, it is an object of the present invention to provide a technique that can efficiently carry out a registration into a search table using a hash function and a retrieval from such a search table.

Means for solving the Problems. For accomplishing the foregoing object, according to the present invention, an information processing device and an information processing method, as shown in FIG. 1, use a data table 101 where first item data are registered along with corresponding second item data, and a pointer table where pointers to the registered data in the data 101 are registered in storage positions that are designated by hash values obtained by applying a predetermined hash function to the first item data of the registered data, wherein registration means 102 implements a registration into the data table 101 with respect to object first item data along with corresponding second item data, or retrieval means 103 implements a retrieval of the corresponding second item data from the data table 101 with respect to object first item data. The present invention is characterized in that the hash function comprises a first hash function and a second hash function, and the pointer table comprises a first pointer table 104 and a second pointer table 105 that are referred to using hash values derived based on the first and second hash functions, respectively.

Here, the information processing device may be, for example, an L2 switch (switching hub) or an L3 switch. The first item data may be, for example, a MAC address. The second item data may be, for example, a port number corresponding to the MAC address. When a plurality of registration data whose hash value is the same, i.e. which are in a synonymous relationship with each other, are generated upon a registration into the data table, it may be configured to allow registrations of data in the synonymous relationship up to a predetermined number such as two. In this event, the registered data in the synonymous relationship are associated with each other by a known method such as chaining or open addressing. In this case, the registered data other than the registered data directly designated by a pointer is designated indirectly by the pointer via chaining or the like. The present invention relates to an information processing device and an information processing method that implement only a registration into the data table, only a retrieval from the table, or both the registration and the retrieval with respect to the first item data.

According to the present invention, the first hash function and the first pointer table, and the second hash function and the second pointer table are used as the hash function and the pointer table. Therefore, by selectively using them depending on respective characteristics of the first and second hash functions, it is possible to suppress a registration of data in a synonymous relationship, limit the number of registrations of data that are in a synonymous relationship with each other, and reduce the size of the data table. Specifically, conventionally, when a bias exists in distribution of values of the first item data, many synonyms are generated with respect to a particular hash value so that there have been those cases where reconstruction of the data table becomes necessary. According to the present invention, however, when the synonym occurs, hash values can be dispersed using another hash function and therefore reconstruction of the data table can be avoided. Further, as compared with a case wherein two hash functions are used and registrations are implemented into individual data tables corresponding to the two hash functions, the size of the data table can be reduced. That is, the registration or retrieval relative to the data table can be achieved more efficiently.

The present invention can be carried out by combining a voluntarily selected one of the following preferred modes or a combination of voluntarily selected two or more of them, with the foregoing basic structure of the present invention.

In a preferred mode of the present invention, upon performing a registration or retrieval, the first hash and the first pointer table are mainly used and, when the registration or retrieval can not be implemented based on them due to occurrence of synonym, the second hash function and the second pointer table are used. The retrieval being unable to be implemented represents, for example, a case where there is an indication in an associated position in the first pointer table that the second pointer table should be referred to, a case where a pointer is not registered, a case where there is an indication that a pointer is invalid, or a case where there is an indication by a later-described selection table that the second pointer table should be referred to.

Further, each of the registered data in the data table is designated directly or indirectly by a pointer that is effectively registered only in one of the first and second pointer tables. When designated indirectly, it is necessary to further trace chaining or the like from the designated position upon a retrieval.

Further, as shown in FIG. 1, there can be provided a selection table 106 where selection data representing which of the first hash function and the first pointer table 104, and the second hash function and the second pointer table 105 are selected and used upon searching through the respective registered data in the data table 101 is registered in a storage position designated by a hash value obtained by applying the first hash function to the first item data of each of the registered data in the data table 101. For example, when it is found out upon a data registration that the object first item data is synonymous with the registered first item data, a bit forming corresponding selection data in the selection table 106 is set to ON to thereby enable setting to select and use the second hash function and the second pointer table As the second hash function, it is possible to employ one that has a higher tendency of dispersing hash values about the first item data, as compared with the first hash function. In this case, when a hash value becomes the same with respect to a plurality of first item data according to the first hash function to thereby cause synonyms, it is possible to increase probability of solving the synonyms using the second hash function.

Upon a registration, it is possible to implement the registration into the data table using the first pointer table with respect to the object first item data, on condition that a pointer is not registered in either of the first and second pointer tables. That is, when the object first item data is unregistered, a registration thereof is carried out using the first pointer table.

Further, upon a registration, when it is found out that the object first item data is a synonym that shares the corresponding pointer in the first pointer table, it is possible to implement the registration with the synonym having been solved, using the second pointer table with respect to the object first item data and the registered first item data that are synonymous with each other. In this case, a registration of data that is in a synonymous relationship and shares the pointer in the first pointer table is not performed. With respect to the registered first item data, it is possible not to change a storage position thereof in the data table, but to register in the second pointer table a pointer designating the storage position thereof.

Instead, it may be configured that with respect to item data that are in a synonymous relationship with each other and share a corresponding pointer in the first pointer table, registrations up to a predetermined number are allowed, while, when the predetermined number is exceeded, all the registrations in the synonymous relationship are caused to be registrations using the second pointer table.

On the other hand, a program according to the present invention is characterized by causing a computer to function as the foregoing information processing device of the present invention. In this case, the program is executed in, for example, a computer shown in FIG. 2. In the figure, symbols 201 and 202 denote a CPU and a memory for executing the program. The data table, the first and second pointer tables, and the selection table are formed in the memory 202. In the figure, symbols 203a, 203b denote ports connected to terminal devices, a LAN, or the like, symbols 204a, 204b denote communication controllers for transmitting/receiving packets via those ports, symbol 205 denotes a buffer for temporarily storing data of received packets, and symbol 206 denotes a bus connecting the respective components together. When the computer carries out a packet relay function, sender addresses in the received packet data in the buffer 205 and numbers of ports that received the packets become objects of registration into the data table as the first item data and the second item data, respectively. Destination addresses in the packet data are used as the first item data for retrieving corresponding port numbers from the data table as the second item data and, when the corresponding port numbers are retrieved, the received packet data are sent out via those ports.

A computer-readable recording medium according to the present invention is characterized by recording therein the program of the present invention. Further, a data structure according to the present invention is characterized by comprising the foregoing data table, first pointer table, and second pointer table, and further the foregoing selection table. Another computer-readable recording medium of the present invention is characterized by recording therein such a data structure.

DETAILED DESCRIPTION

Figure 1:
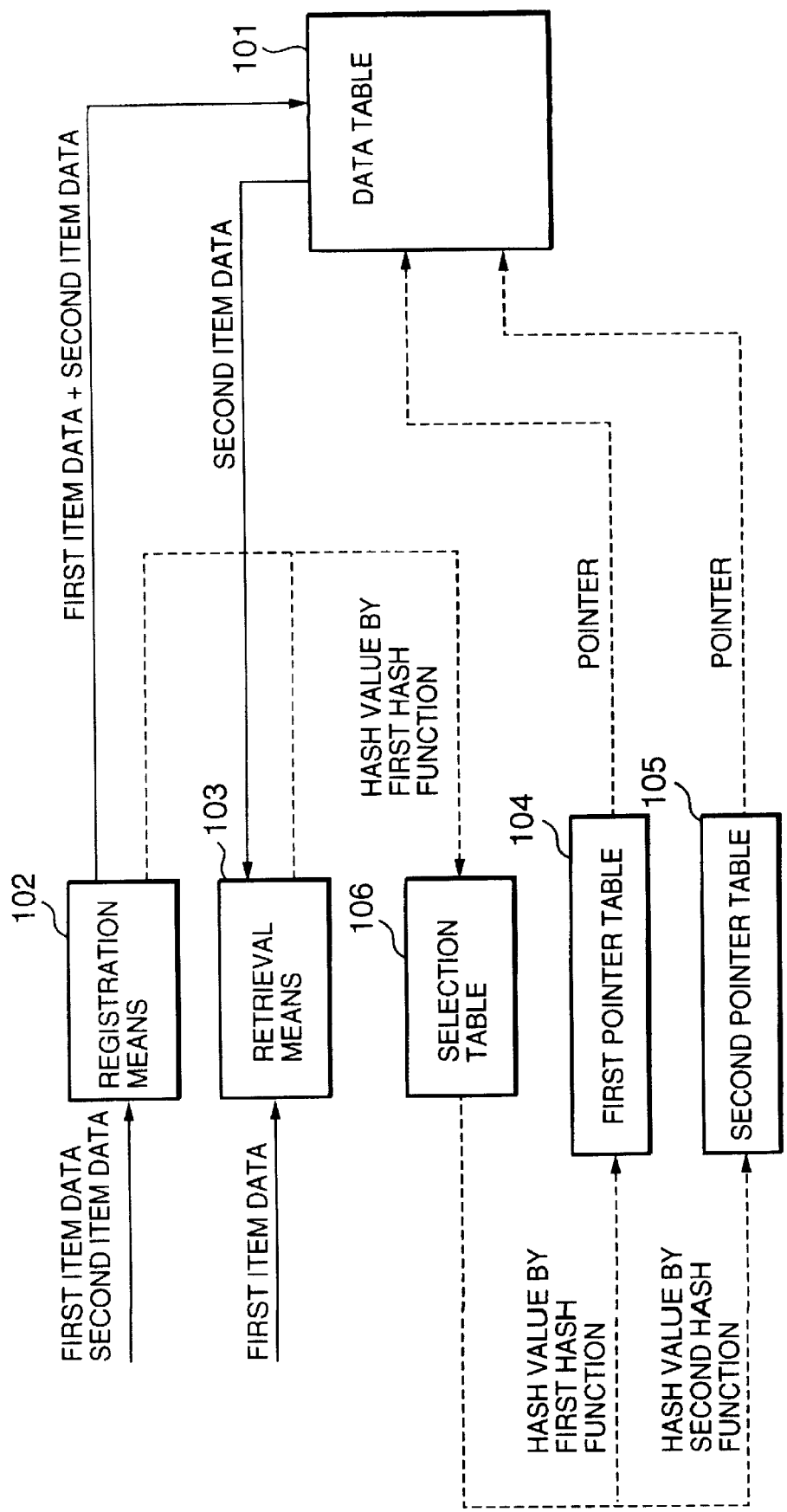
FIG. 1 is a block diagram showing an information processing device according to the present invention.
Figure 2:
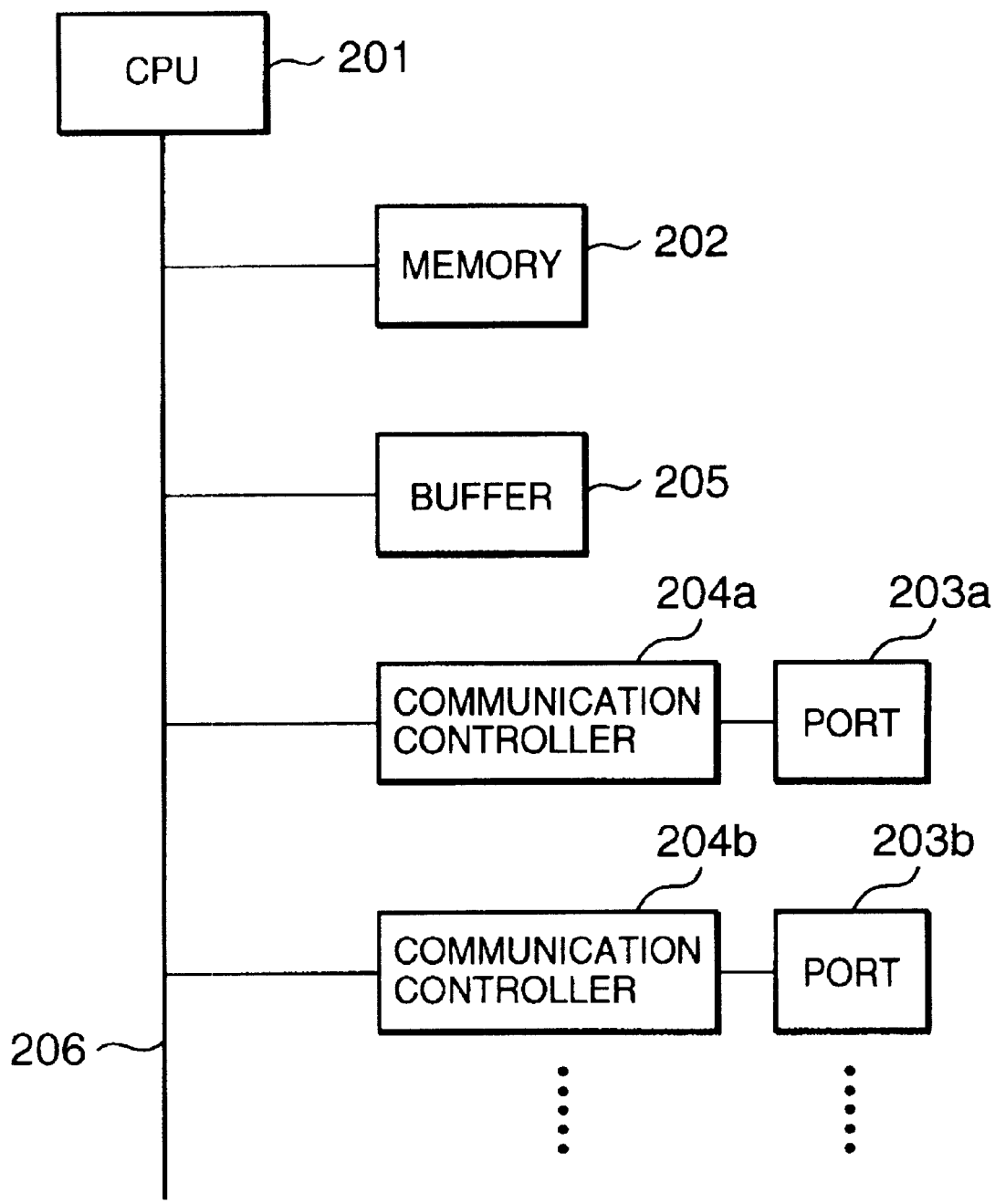
FIG. 2 is a diagram showing a hardware structure for executing a program according to the present invention.
Figure 3:
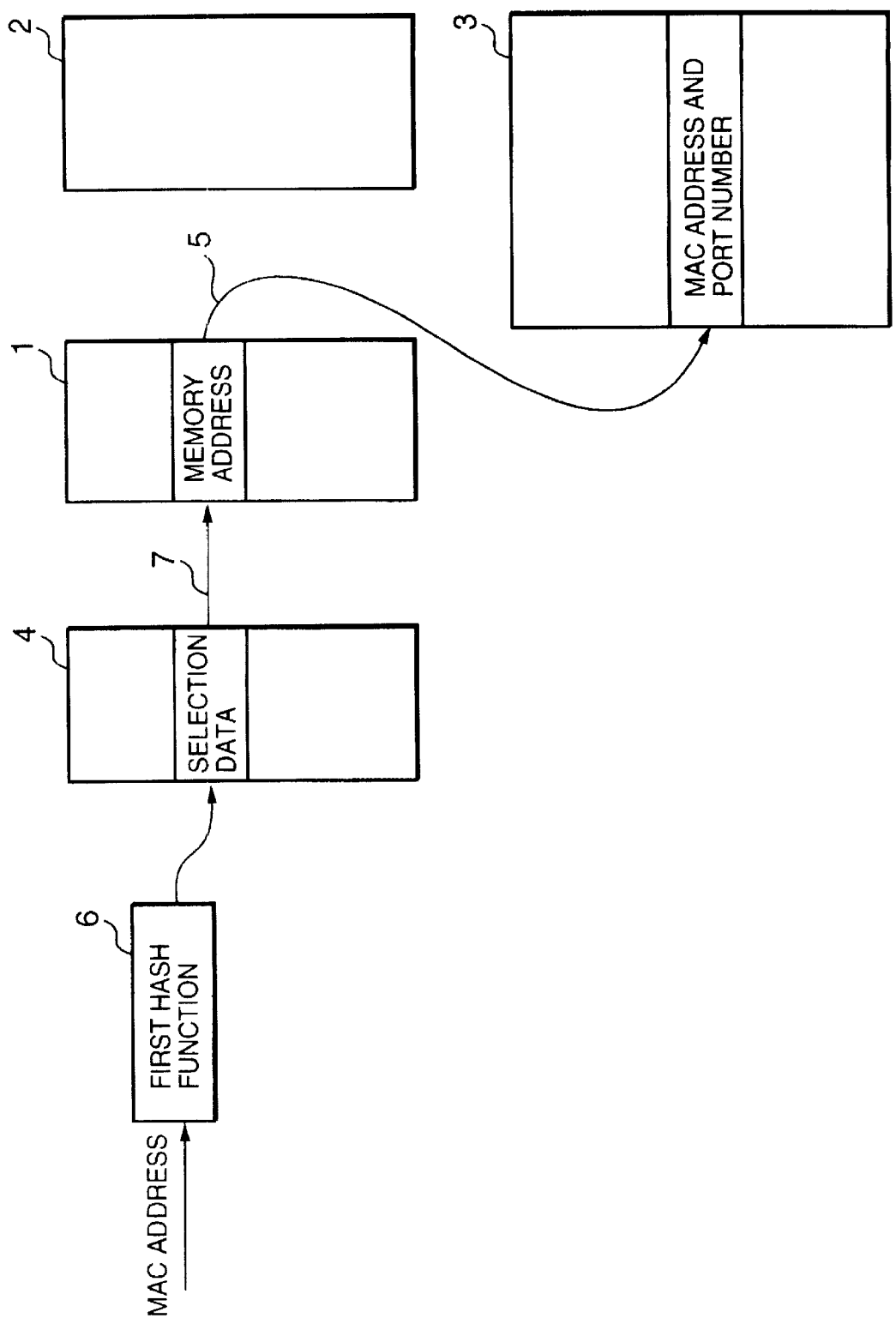
FIG. 3 is a diagram showing a structure of each of tables used in a switch device according to one preferred embodiment of the present invention.

FIG. 3 shows a structure of each of tables used in a switch device according to one preferred embodiment of the present invention. The switch device transfers a packet, received at each port, from a port corresponding to a destination MAC address in the packet. The port corresponding to the MAC address can be known from a port address that is acquired based on a search using the tables.

As shown in the figure, the switch device comprises a MAC address table 3 where MAC addresses are registered along with corresponding port addresses, first and second pointer tables 1 and 2 where pointers to respective registered data in the MAC address table 3 are registered, and a selection table 4 where selection data representing which of the first and second pointer tables 1 and 2 is to be selectively used is registered.

The MAC address table 3 has a size of 128 k×64[bits]. Specifically, the MAC address table 3 has a capacity of 128 k records each composed of 64[bits]. Each of the first and second pointer tables 1 and 2 has a size of 64 k×17[bits], while the election table 4 has a size of 64 k×1[bits].

Figure 4:
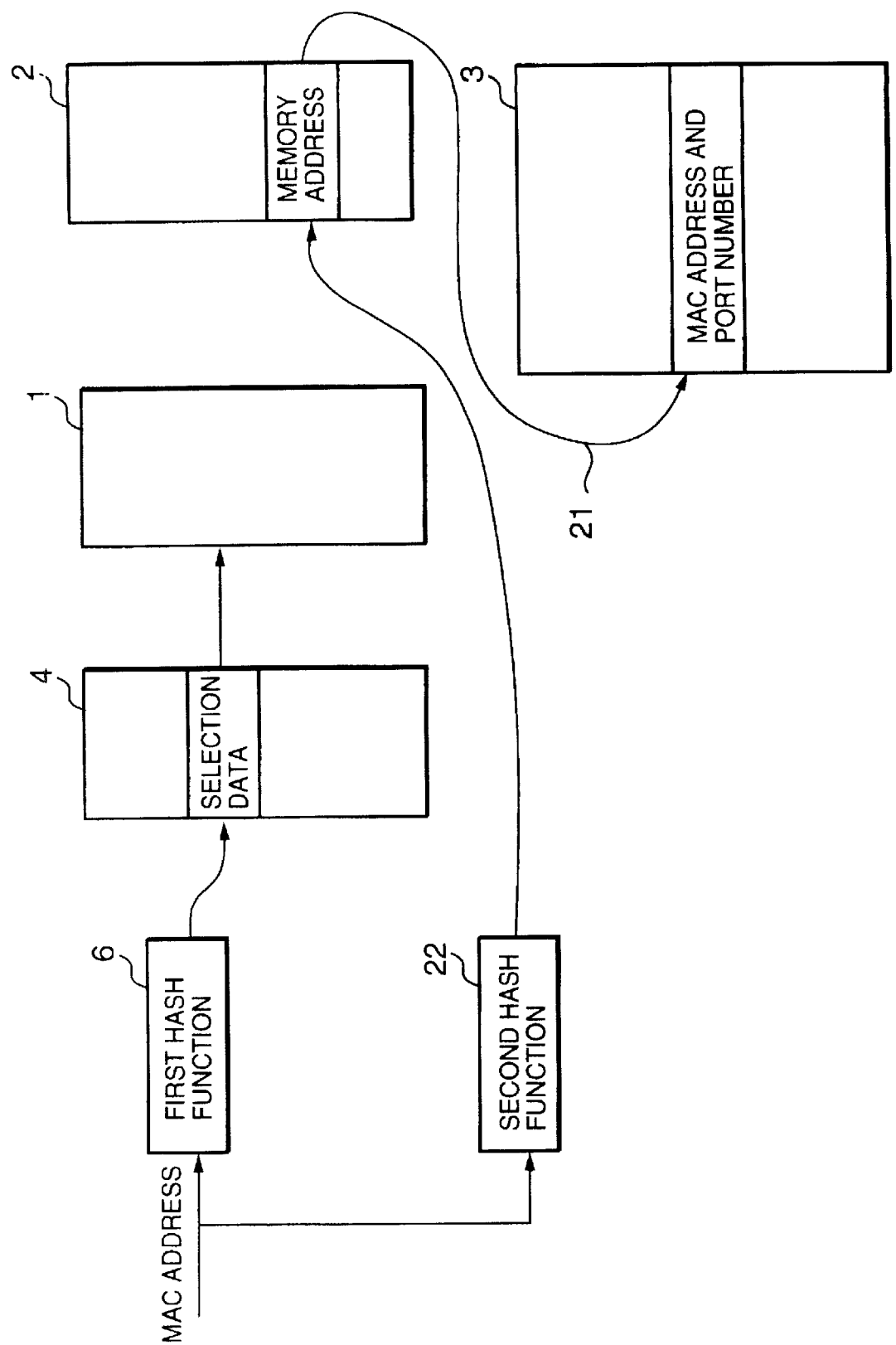
FIG. 4 is a diagram showing the state of a retrieval in a table structure of FIG. 1, wherein a second hash function is used.

In the first pointer table 1, memory addresses are registered as pointers each designating, like an arrow 5, a storage position of corresponding registered data in the MAC address table 3. A storage position of each memory address in the first pointer table 1 is designated by a hash value, like an arrow 7, obtained by applying a first hash function 6 to a corresponding MAC address. As shown in FIG. 4, memory addresses are also registered in the second pointer table 2 as pointers each designating, like an arrow 21, a storage position of corresponding registered data in the MAC address table 3. A storage position of each memory address in the second pointer table 2 is designated by a hash value obtained by applying a second hash function 22 to a corresponding MAC address. A storage position of each registered data in the MAC address table 3 is designated by a memory address that is effectively registered only in one of the first and second pointer tables 1 and 2.

Figure 5:
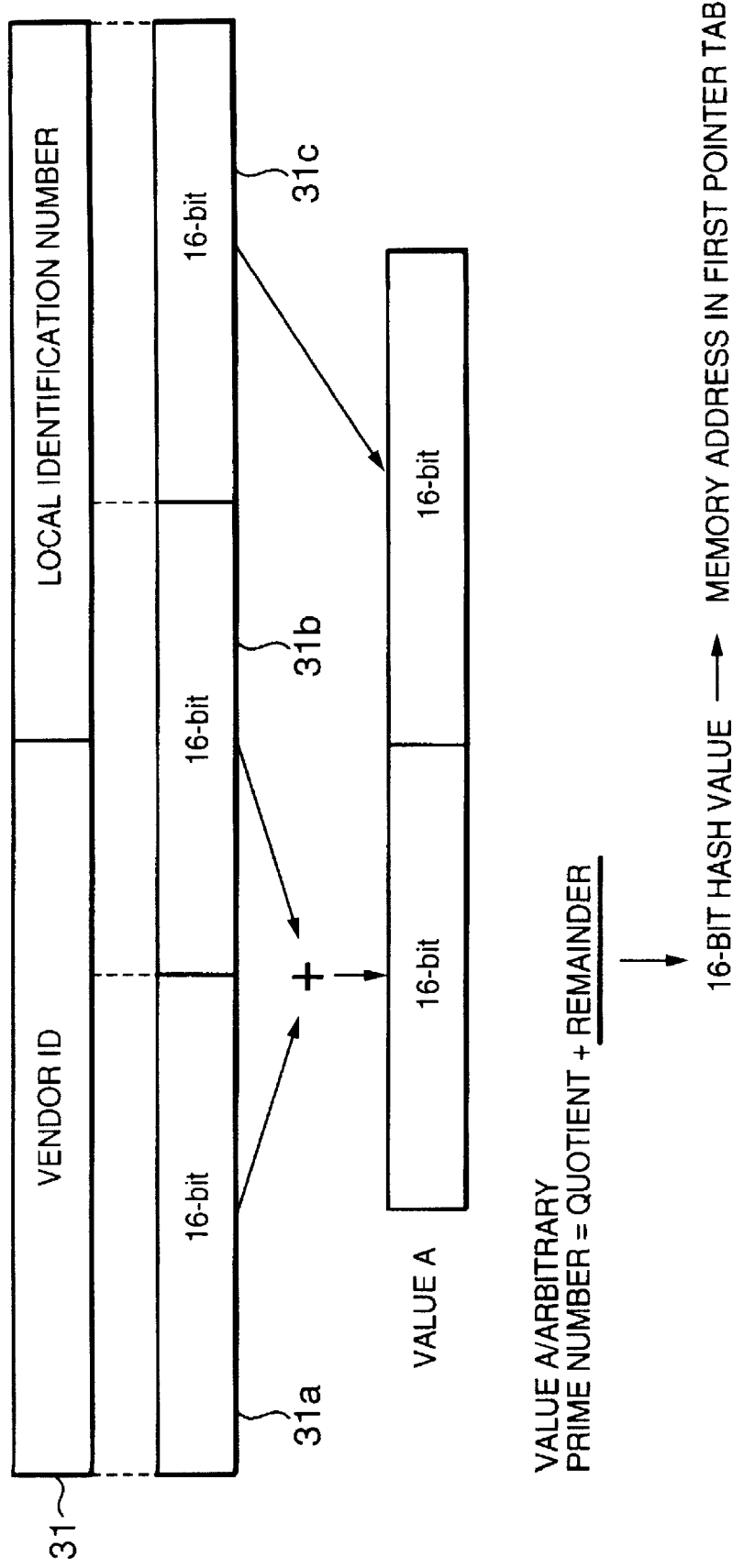
FIG. 5 is a diagram showing a first hash function used in the device of FIG. 1.

As shown in FIG. 5, the first hash function is such that upper 16 bits 31*a* and intermediate 16 bits 31*b* of a MAC address 31 composed of a 24-bit vendor ID and a 24-bit local identification number are added together, and a 32-bit value A obtained by combining a result of the addition with lower 16 bits 31*c* of the MAC address 31 is divided by an arbitrary 16-bit prime number, thereby to obtain a remainder of the division as a 16-bit hash value. In this event, a carry generated as a result of the addition may be discarded or added to the least significant bit.

Figure 6:
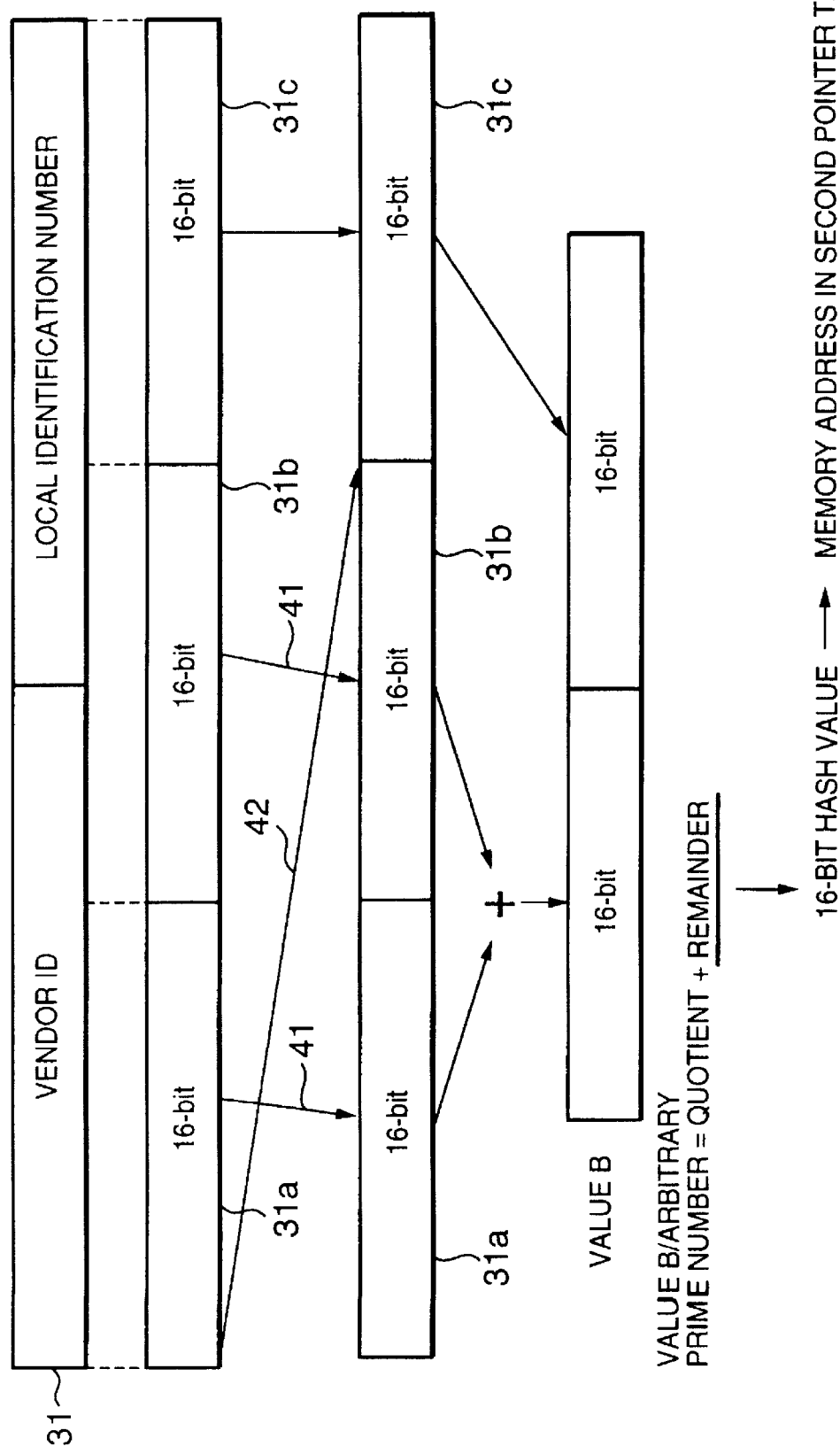
FIG. 6 is a diagram showing a second hash function used in the device of FIG. 1.

As shown in FIG. 6, the second hash function is such that a bit shift is implemented with respect to upper 32 bits 31*a* and 31*b* of a MAC address 31, then upper 16 bits and intermediate 16 bits 31*b* are added together, and a 32-bit value B obtained by combining a result of the addition with lower 16 bits 31*c* of the MAC address 31 is divided by an arbitrary 16-bit prime number, thereby to obtain a remainder of the division as a 16-bit hash value. The amount of the bit shift may be one to several bits. In FIG. 6, an arrow 41 represents a leftward shift, while an arrow 42 represents sequential rotation of the most significant bit toward the least significant bit. Since the number of data allocated as local identification numbers is far greater than the number of data allocated as vendor IDs, the second hash function obtained by dividing the value of the upper 32 bits after the bit shift exhibits a higher tendency of dispersing the hash values with respect to the MAC addresses, as compared with the first hash function.

The first hash function and the first pointer table are mainly used upon retrieving a port address corresponding to a destination MAC address in a received packet and, when a retrieval can not be achieved by the use of them, then the second hash function and the second pointer table are used. By using the selection table 4, it is possible to know in advance as to which of them can be used. A storage position of each selection data in the selection table 4 is designated by a hash value obtained by applying the first hash function to a corresponding MAC address. Upon searching the MAC address table 3 based on a destination MAC address, selection data corresponding to a hash value derived by the first hash function often represents using the first pointer table 1 as shown in FIG. 3. On the other hand, when the first pointer table 1 can not be used, it represents using the second pointer table 2 as shown in FIG. 4.

Figure 7:
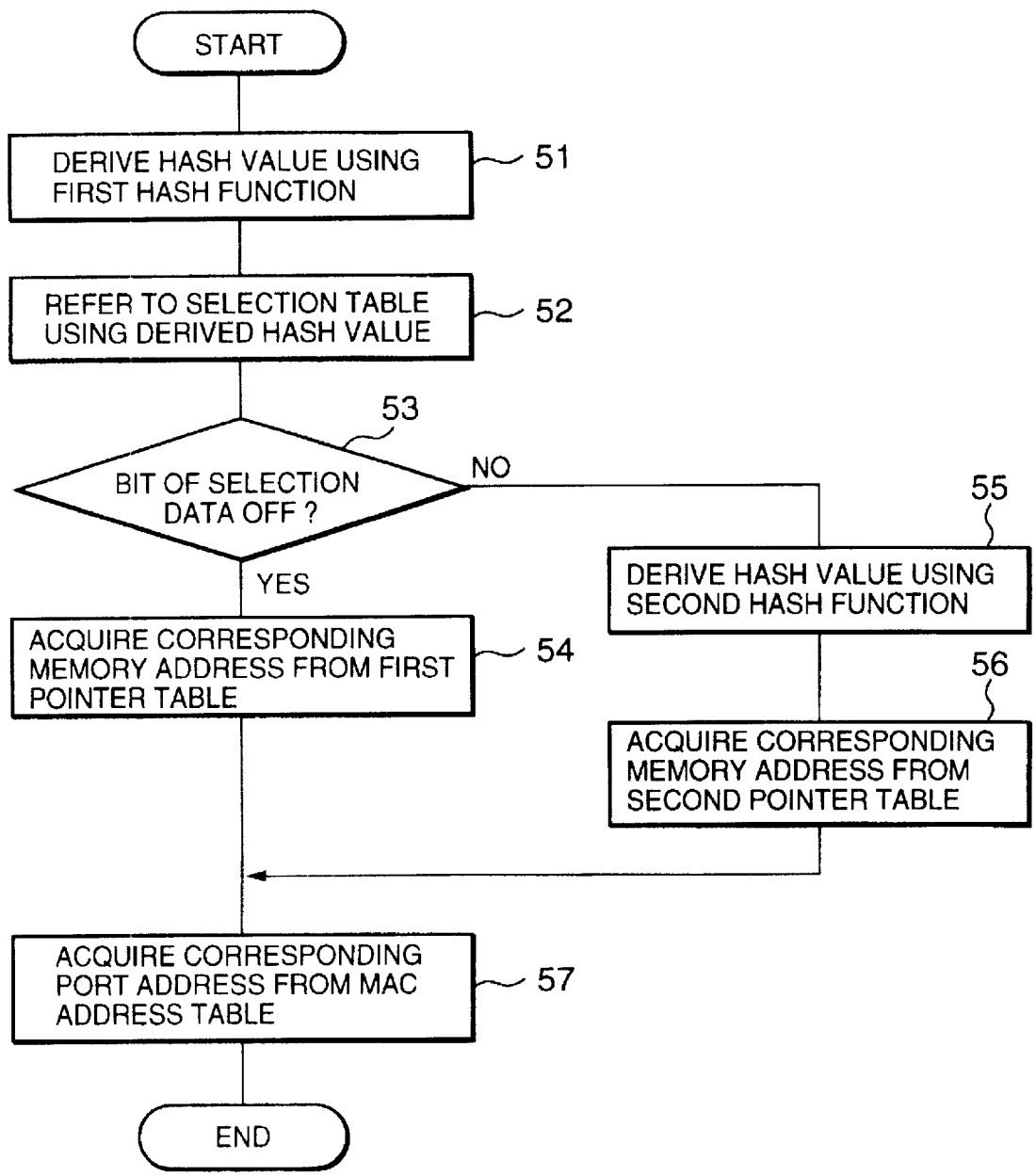
FIG. 7 is a diagram showing processing of a retrieval from a MAC address table in the device of FIG. 1.

FIG. 7 is a flowchart showing processing of retrieving a port address corresponding to a destination MAC address. When the processing is started, a hash value is first obtained by applying the first hash function to a destination MAC address in step 51. Then, in step 52, reference is made to selection data in a storage position in the selection table 4 designated by the obtained hash value. Then, it is checked whether the selection data referred to represents using the first or second pointer table. In this event, the selection data represents using the first pointer table when a bit forming the selection data is OFF, while represents using the second pointer table when it is ON. When the bit is OFF, the processing proceeds to step 54. On the other hand, when the bit is ON, the processing proceeds to step 55.

Step 54 acquires a memory address in a storage position of the first pointer table 1 that is designated by the hash value obtained in step 51, and the processing goes to step 57. In step 55, a hash value is obtained by applying the second hash function to the destination MAC address. Then, step 56 acquires a memory address in a storage position of the second pointer table 2 designated by the obtained hash value, and the processing goes to step 57.

In step 57, reference is made to the MAC address table 3 using the obtained memory address and, on condition that a MAC address of corresponding registered data should agree with the destination MAC address, a corresponding port address is acquired. This terminates the processing of retrieving a port corresponding to the destination MAC address.

Thereafter, by sending the received packet from port of the acquired port address, the switch device can transfer the received packet toward a device identified by the destination MAC address. If the MAC addresses do not agree with each other and therefore the corresponding port address can not be acquired in step 57, the packet is sent out from all the ports.

Figure 8:
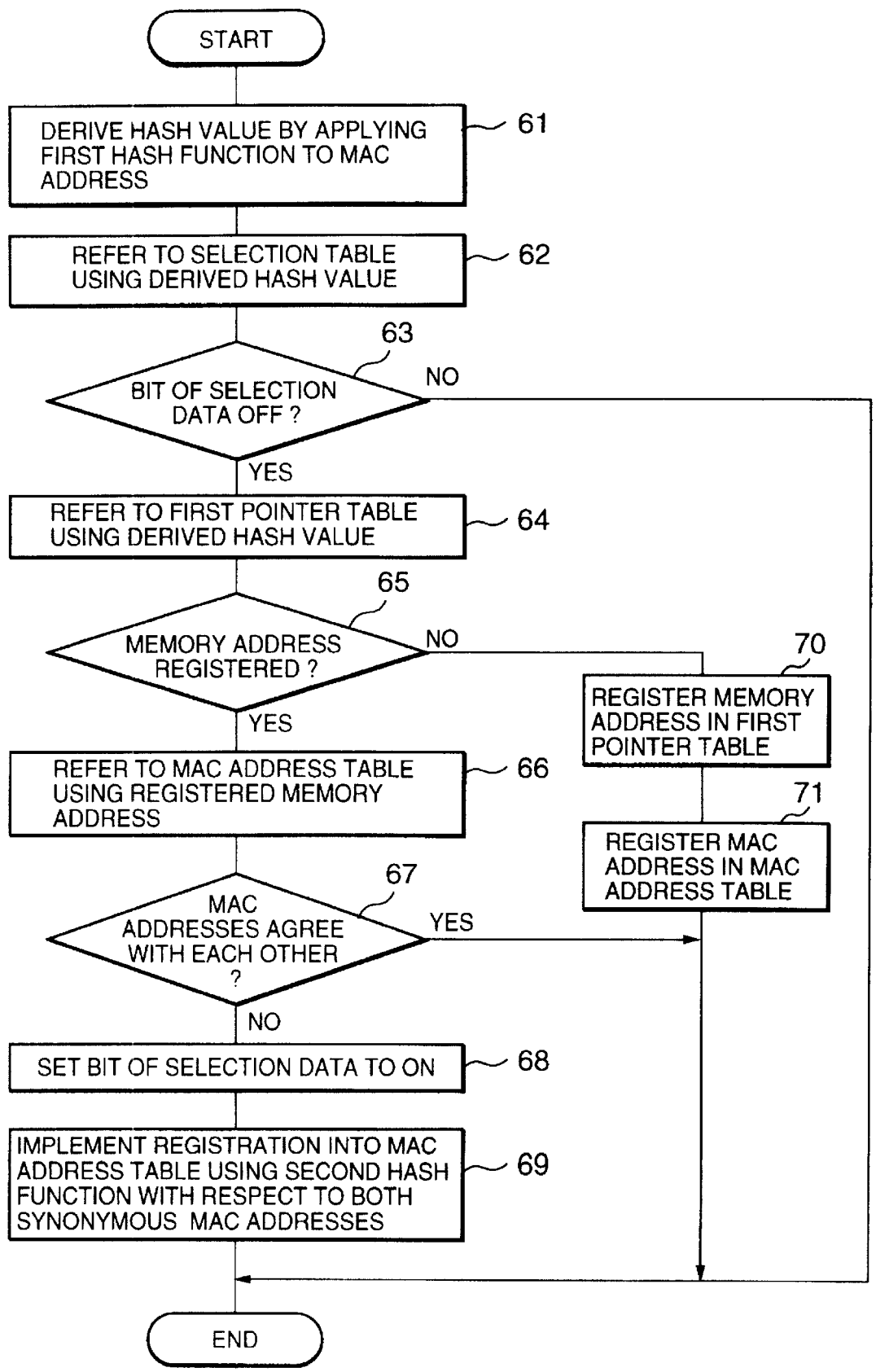
FIG. 8 is a diagram showing processing of a registration into the MAC address table in the device of FIG. 1.

FIG. 8 is a flowchart showing processing of a data registration into the MAC address table 3. When a packet is received, the data registration processing is carried out with respect to a sender MAC address in the packet. First, in step 61, a hash value is obtained by applying the first hash function to a sender MAC address of a received packet.

Then, in step 62, reference is made to the selection table 4 using the obtained hash value, and step 63 judges whether or not a bit of selection data referred to is OFF. The bit being OFF represents that a registration using the first hash function and the first pointer table has already been implemented or has not yet been implemented with respect to the sender MAC address concerned. In this case, the processing proceeds to step 64. The bit of the selection data not being OFF represents that a registration using the second hash function and the second pointer table has already been implemented with respect to the sender MAC address concerned, or that the sender MAC address concerned is synonymous with a MAC address having been registered using the second hash function and the second pointer table. In this case, no registration is carried out with respect to the sender MAC address concerned, and the processing is terminated at once. That is, a registration of a MAC address that is in a synonymous relationship via the second pointer table 2 is not carried out.

In step 64, reference is made to the first pointer table using the hash value obtained in step 61, and step 65 judges whether or not a memory address has been registered in a referring position. If the referring position has an initial value, for example, zero, it is possible to judge that the memory address has not been registered. The memory address having been registered means that a registration into the MAC address table 3 using the first hash function has already been implemented with respect to the sender MAC address concerned or a MAC address synonymous therewith. In this case, the processing proceeds to step 66. On the other hand, the memory address having not been registered means that a registration into the MAC address table 3 using the first hash function has not yet been performed with respect to either the sender MAC address concerned or a MAC address synonymous therewith. In this case, the processing proceeds to step 70.

In step 66, reference is made to the MAC address table 3 using the registered memory address, and step 67 judges whether or not the sender MAC address concerned agrees with a MAC address in a referring position. Both MAC addresses not agreeing with each other means occurrence of synonym. In this case, the processing proceeds to step 68 for solving the occurrence of synonym. On the other hand, when both MAC addresses agree with each other, since it means that the sender MAC address has already been registered, the processing is terminated at once.

In step 68, the bit of the selection data referred to in step 62 is set to ON. Specifically, when a hash value derived by a destination MAC address and the first hash function designates the selection data concerned a search is carried out using the second hash function with respect to the destination MAC address concerned. Then, in step 69, a registration into the MAC address table 3 is implemented via the second pointer table using the second hash function with respect to both the registered MAC address and the sender MAC address concerned that have been judged not to agree with each other in step 67. Specifically, the second hash function has a higher variance tendency as compared with the first hash function, and therefore, in general, when the second hash function is applied to both MAC addresses, respectively, different hash values can be obtained so that it is possible to achieve a registration while solving the synonym.

In this event, as a port address that is registered correspondingly to the sender MAC address concerned, an address of a port that received the packet of the sender MAC address concerned is used. On the other hand, with respect to the registered MAC address, it is not necessary to change the storage position thereof in the MAC address table 3, while it is sufficient to cause a corresponding memory address in the second pointer table to designate such a storage position. When the registration with the synonym having been solved is completed, the data registration processing is terminated.

On the other hand, in step 70, a memory address representing a storage position of the MAC address table 3 where the sender MAC address concerned is registered, is registered in the first pointer table. A registration position of the memory address is designated by the hash value derived using the first hash function in step 61. As the memory address to be registered, it is possible to select, for example, the minimum address among unused addresses in the MAC address table 3. Then, in step 71, sender MAC address is registered along with the corresponding port address in the MAC address table. The registration position thereof in the MAC address table is designated by the memory address registered in step 70. When this registration is completed, the data registration processing is terminated.

According to this embodiment, since the first and second hash functions are used as a hash function, and the first and second pointer tables 1 and 2 that are referred to using hash values derived by the first and second hash functions, respectively, are used as a pointer table, it is possible to utilize a difference in characteristic between the first and second hash functions, wherein a registration is not implemented with respect to a MAC address that is in a synonymous relationship, but can be implemented after solving the synonymous relationship. Therefore, it is possible to avoid the broadcast required when a registration can not be implemented due to occurrence of synonym, and reconstruction of the MAC address table 3. Further, as compared with a case wherein two hash functions are used, and further, independent MAC address tables 3 corresponding thereto are used, the size of the MAC address table 3 can be reduced.

Further, upon performing a retrieval or registration relative to the MAC address table 3, the first hash function and the first pointer table are mainly used and, when the retrieval or registration can not be implemented based on them, the second hash function and the second pointer table are used. Therefore, the retrieval or registration can be efficiently carried out.

Further, each registered data in the MAC address table 3 is designated by a pointer that is effectively only in one of the first and second pointer tables. Therefore, by knowing in advance the first or second pointer table to be used, the search can be conducted quickly.

Further, the selection table is used where selection data representing which of the first hash function and the first pointer table, and the second hash function and the second pointer table are selected and used upon searching through the respective registered data in the MAC address table 3 is registered in a storage position designated by a hash value obtained by applying the first hash function to a MAC address of each registered data in the MAC address table 3. Therefore, it is possible to know in advance as to which of the first and second pointer tables is to be used, and hence, the search can be carried out quickly.

Further, the second hash function shows a higher tendency of dispersing the hash values with respect to the MAC addresses, as compared with the first hash function. Therefore, when synonym occurs by the use of the first hash function, the synonym can be easily solved to enable a registration by using the second hash function instead of the first hash function.

Further, when a pointer is not registered in either of the first and second pointer tables with respect to an object MAC address, a registration into the MAC address table 3 using the first pointer table is implemented (steps 63 to 65, 70, and 71). Therefore, it is possible to carry out a registration that preferentially uses the first hash function.

Further, when it is found out that an object MAC is a synonym that shares a corresponding pointer in the first pointer table, a registration with the synonym having been solved is implemented using the second pointer table with respect to the object MAC address and a registered MAC address that are synonymous with each other (steps 63 to 69). Therefore, it is possible to suppress the broadcast or the reconstruction of the MAC address table 3, and perform the search quickly.

Further, upon implementing the registration with the synonym having been solved, a storage position in the MAC address table 3 is not changed with respect to the registered MAC address, but a pointer designating the storage position is registered in the second pointer table. Therefore, a process that would be required due to the change in storage position becomes unnecessary, and thus, the processing can be performed efficiently.

The present invention is not limited to the foregoing embodiment, but can be carried out with suitable modifications. For example, a registration of data in a synonymous relationship is not implemented in the foregoing description, but instead, it may be configured that with respect to first item data that are in a synonymous relationship with each other and share a corresponding pointer in the first pointer table, registrations up to a predetermined number are allowed, while, when the predetermined number is exceeded, all the registrations in the synonymous relationship are caused to be registrations using the second pointer table as much as possible.

Further, in the foregoing, the description has been given about the case wherein a sender MAC address of a received packet is registered along with information indicative of a corresponding port, and information of a corresponding port is retrieved with respect to a destination MAC address. However, the present invention is not limited thereto, but is applicable to all cases wherein, with respect to fixed-length data, a registration using a hash function is implemented along with corresponding data, and a retrieval of corresponding data is carried out.

Further, in the foregoing description, the selection table 4 is used for knowing in advance as to which of the first hash function and the first pointer table, and the second hash function and the second pointer table are selected and used upon searching the MAC address table 3. Instead thereof, however, like information may be added to the first pointer table.

Although not particularly referred to in the foregoing description, a hardware configuration mainly using electronic circuits, or a configuration using computer programs can be employed as a configuration for implementing the processing of FIGS. 7 and 8.

While the invention has been described in terms of specific embodiment, it is evident in view of the foregoing description that numerous alternative, modifications and variations will be apparent to those skilled in the art. Thus, the invention is intended to encompass all such alternative, modifications and variations which fall within the scope and spirit of the invention and the appended claims.

The invention claimed is:

1. An information processing device comprising: a data table having at least one first item data, each of the at least one first item data having a corresponding second item data, each of the at least one first and second item data registered; a pointer table having pointers to the registered data in said data table, said pointers referenced in storage positions, said storage positions designated by hash values, said hash values obtained by applying a predetermined hash function to the at least one first item data; and a member selected from a group consisting of registration means and retrieval means, said registration means comprising a means for implementing a registration for said at least one first item data and corresponding second item data in said data table and said retrieval means comprising a means for implementing a retrieval of said second item data from said data table when said first item data is retrieved, said registration means and said retrieval means capable of being disabled by a synonym, wherein said hash function comprises a first and a second hash function and said pointer table comprises a first and second pointer tables accessed using hash values derived from said corresponding first and second hash functions, wherein said registration means and said retrieval means use said first hash function and said first pointer table when enabled and said second hash function and said second pointer table when disabled.

2. An information processing device according to claim 1, wherein each of the registered data in said data table is designated by a pointer that is accessed by at most one of said first and second pointer tables.

3. An information processing device according to claim 1, further comprising a selection table having selection data, said selection data identifying which of said first hash function and said first pointer table and said second hash function and said second pointer table are selected, said selection table used when searching through the respective registered data in said data table.

4. An information processing device according to claim 1, wherein said registration means implements the registration of said first item data into said data table using said first pointer table, said registration means verifying that said first item data is not registered in first pointer table or the second pointer table.

5. An information processing device according to claim 1, wherein a synonymous first item data shares a pointer in said first pointer table with said registered first item data, said registration means using said second pointer table to register said synonymous first item data, said registration of said synonymous first item data not affecting the storage position in said data table of said registered first item data, said second pointer table having a pointer designating said storage position of said synonymous first item data.

6. An information processing device according to claim 1, wherein said registered first item data and said synonymous first item data share a pointer in said first pointer table, said registration means allowing a predetermined number of registrations, said registration means causing all additional synonymous registrations to be registrations in the second pointer table once the predetermined numbers of registrations into the first pointer table are exceeded.

7. An information processing device according to claim 1, wherein said registration of said first item data and corresponding second item data includes a sender address in a packet or frame received by the device and corresponding port identification data, and said retrieval of said first item data and corresponding second item data includes a destination address of said packet or frame and corresponding port identification data.

8. An information processing device according to claim 7, wherein said sender and destination addresses are MAC addresses, and the device functions as a switch device that transfers the received packet or frame from a corresponding port to the destination MAC address in said received packet or frame.

9. A data structure comprising: a data table where first item data are registered, each first item data having a corresponding second item data; a first pointer table where pointers to a first part of the registered data in said data table are registered in storage positions that are designated by hash values obtained by applying a first hash function to the first item data; a second pointer table where pointers to a second part of the registered data in said data table are registered in storage positions that are designated by hash values obtained by applying a second hash function to the first item data of the other registered data; and a selection table where selection data representing which of said first and second pointer tables is used for searching through the registered data in said data table wherein a registration means and a retrieval means use said first hash function and said first pointer table when enabled and said second hash function and said second pointer table when disabled, said registration means comprising a means for implementing a registration for said at least one first item data and corresponding second item data in said data table and said retrieval means comprising a means for implementing a retrieval of said second item data from said data table when said first item data is retrieved, said registration means and said retrieval means capable of being disabled by a synonym.

* * * * *